(No Model.)

F. S. DERR & G. W. HESS.
WHEEL.

No. 477,740. Patented June 28, 1892.

Witnesses:
Chas. A. Ford.
W. S. Duvall.

Inventors.
Fuller S. Derr.
Geo. W. Hess.
By their Attorneys,
C. A. Snow & Co.

UNITED STATES PATENT OFFICE.

FULLER S. DERR AND GEORGE W. HESS, OF WATSONTOWN, PENNSYLVANIA.

WHEEL.

SPECIFICATION forming part of Letters Patent No. 477,740, dated June 28, 1892.

Application filed January 6, 1892. Serial No. 417,180. (No model.)

*To all whom it may concern:*

Be it known that we, FULLER S. DERR and GEORGE W. HESS, citizens of the United States, residing at Watsontown, in the county of Northumberland and State of Pennsylvania, have invented a new and useful Wheel, of which the following is a specification.

This invention relates to improvements in wheels; and the objects in view are to provide a cheap and simple construction of wheel adapted to automatically expand to accommodate itself to the expansion of the tire, and thus to obviate the necessity of subsequently shrinking the tire and always maintaining a tight rigid wheel.

A further object of the invention is to provide a tire to be used in connection with the automatically-expansible rim and to be so constructed as to obviate the necessity of employing bolts or other extraneous devices for maintaining it in position upon the rim.

Other detailed objects of the invention will appear in the following description, and the novel features thereof will be particularly pointed out in the claims.

Figure 1:
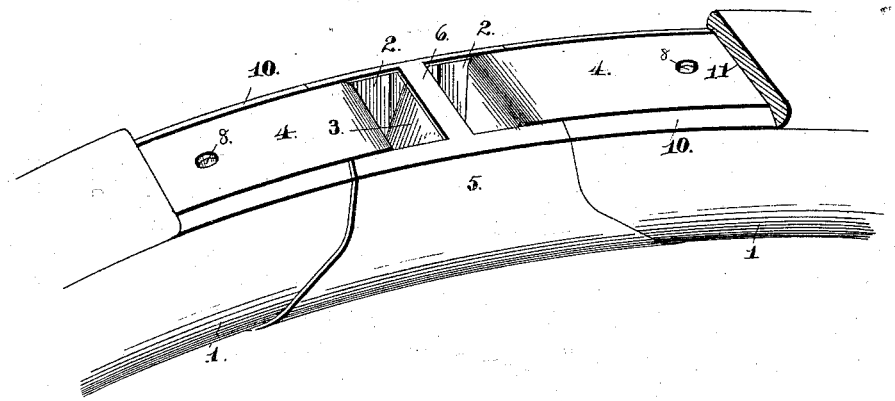
Figure 2:
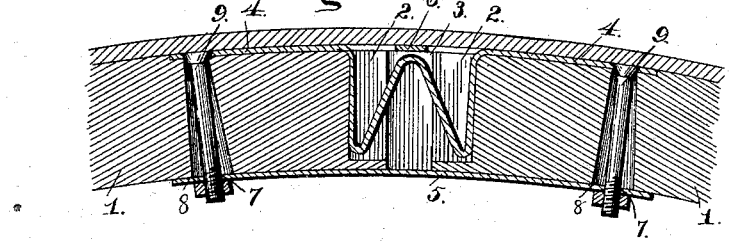
Figure 3:
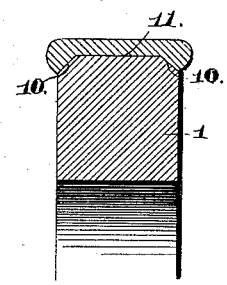
Figure 4:
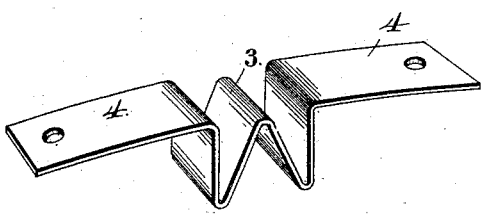
Figure 5:
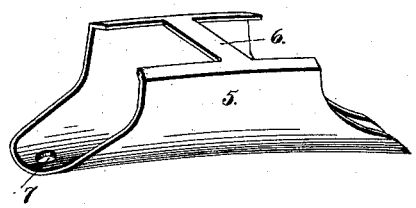

Referring to the drawings, Figure 1 is a perspective of a portion of a wheel constructed in accordance with our invention, a part of the tire being broken away to expose a felly-joint. Fig. 2 is a longitudinal section of the same. Fig. 3 is a transverse section through the felly and tire. Fig. 4 is a detail in perspective of the spring employed in the joint of the rim. Fig. 5 is a detail in perspective of the felly plate or clip.

Like numerals of reference indicate like parts in all the figures of the drawings.

1 designates two adjacent fellies comprised in the rim of a wheel, and the same have their ends arranged a short distance from each other and have their outer sides or faces mortised, as indicated at 2, which mortises extend down into the ends of the fellies. Interposed between these mortised ends of the fellies is a strong spring 3, which spring we bend into the form of the letter W and have its terminals laterally extended to form securing-plates 4, which, as shown, are perforated. In mounting the spring between the ends of the fellies the terminals or securing-plates 4 of the spring rest in the upper portions of the mortises, and hence are flush with the outer surfaces of the fellies.

The felly-plate 5 has a general U shape in cross-section, so as to embrace the fellies at their meeting-point, and in this instance extend to the edge or perimeter of the rim, where its edges are connected by a transverse clip bar or strap 6, which extends over the spring 3. The felly-plate and its clip-bar are preferably formed integral and of malleable iron. The opposite ends of the felly-plate are provided with bolt-receiving openings or fellies 7, and the same register with and are radially opposite to the perforations formed in the terminals of the W-shaped spring and are also opposite enlarged or elongated openings 8, formed in the fellies between the felly-plate and the terminals of the spring. Through these perforations bolts 9 are passed, the taps being on the inner sides of the rim and not drawn so tight as to wholly obviate independent movement of the fellies to and from each other. The opposite edges of the rim are beveled, as indicated at 10, and the inner surface of the tire is channeled to correspond thereto, and by reason of its channeling 11 cannot when fitted upon the rim have any lateral movement. The tread of the tire may be made slightly wider than the rim, or at least should be equally as wide, in order to bear evenly upon each of the beveled sides of the rim, and also at the center. The tire is not perforated, and hence is not weakened for the reception of the usual bolts, but in this instance is prevented from lateral movement by reason of its channeling, and such channeling is rendered efficient for this purpose by the automatic expanding of the rim in accordance with the expansion of the tire.

In practice one or more constructions of felly-joints as we have described may be employed, the one shown in the present application being considered sufficient to give a clear understanding of our invention.

In assembling the parts the fellies are first connected and the springs placed in position between the ends of the same, the felly plate and clip being slipped over the joint. The bolts 9 are placed in position so as to connect the parts. The tire is now heated and expands and is placed upon the rim in this condition, the several springs being expanded. The tire being allowed to cool shrinks, thus compressing the rim and springs against the tension of the latter, the channel of the tire thus snugly fitting the rim. It will be seen now that all subsequent shrinking of the rim and expansion of the tire will be compensated for automatically by the expansion of the spring, all looseness being constantly and automatically taken up, and hence loose tires and the necessity of shrinking the same is avoided. When the tire has shrunken to its position, the springs are so collapsed as to virtually bring the securing-plates 4 together or in contact with the edges of strip 6, so that no undue weight falls upon the spring or the thin edges of the rim.

Having described our invention, what we claim is—

1. In a wheel, the combination, with felly-sections, the ends of which are provided with mortises, of an interposed sinuous spring, means for securing the spring in position, and a tire having a channeled inner surface embracing the rim, substantially as specified.

2. In a wheel, the combination, with the fellies having mortised ends, of the W-shaped spring, the ends of which terminate in securing-plates and are flush with the outer face of the rim, means for securing the spring in position, and a rim-encircling tire, substantially as specified.

3. In a wheel, the combination, with the tire, of series of felly-sections combining to form a rim and inclosed by a tire, with which they are loosely connected, and springs adapted to spread the felly-sections at the expansion of the tire and located between the adjacent ends of the sections, substantially as specified.

4. In a wheel, the combination, with the opposite fellies channeled at their ends and outer sides and provided with elongated openings, of the W-shaped spring interposed between the ends and having its terminals laterally and oppositely disposed to form securing-plates seated in the other mortises of the fellies and perforated to agree with the perforation of the fellies, the felly-plate embracing the rim and having the transverse clip-bar connecting its edges and arranged across the spring, said felly-plate being provided with perforations agreeing with those in the fellies and spring, bolts passed through the perforation of the spring, felly, and felly-plate, and a tire mounted upon the rim, substantially as specified.

5. In a wheel, the combination, with the opposite fellies channeled at their ends and outer sides and provided with elongated openings, of the W-shaped spring interposed between the ends and having its terminals laterally and oppositely disposed to form securing-plates seated in the outer mortises of the fellies and perforated to agree with the perforation of the fellies, the felly-plate embracing the rim and having the transverse clip-bar connecting its edges and arranged across the spring, said felly-plate being provided with perforations agreeing with those in the fellies and spring, bolts passed through the perforation of the spring, felly, and felly-plate, and the tire having its inner face channeled so as to embrace and receive the outer periphery of the rim, said tire being imperforate and the rim being provided with opposite beveled edges, substantially as specified.

In testimony that we claim the foregoing as our own we have hereto affixed our signatures in the presence of two witnesses.

FULLER S. DERR.
GEORGE W. HESS.

Witnesses:
W. C. BRIMMER,
W. C. HOLMES.